United States Patent [19]
Nakanishi et al.

[11] 3,859,275
[45] Jan. 7, 1975

[54] THIENODIAZEPINE COMPOUNDS

[75] Inventors: Michio Nakanishi, Oita; Masami Shiroki, Yoshitomi-machi; Tetsuya Tahara, Yoshitomi-machi; Kazuhiko Araki, Yoshitomi-machi, all of Japan

[73] Assignee: Yoshitomi Pharmaceutical Industries, Ltd., Osaka, Japan

[22] Filed: May 31, 1972

[21] Appl. No.: 258,285

[30] Foreign Application Priority Data
May 31, 1971 Japan............... 46-38086
May 31, 1971 Japan............... 46-38087
May 31, 1971 Japan............... 46-38088

[52] U.S. Cl......... 260/239.3 B, 260/332.2, 244/275
[51] Int. Cl............................................ C07d 53/02
[58] Field of Search ........................... 260/239.3 B

[56] References Cited
UNITED STATES PATENTS
3,558,606   1/1971   Tinney ................ 260/239.3 T
3,669,959   6/1972   Hromatka et al. ........ 260/239.3 B OTHER PUBLICATIONS
Sternbach, et al., "Some Aspects of Structure–Activity Relationship in Phychotropic Agents of the 1,4-Benzodiazepine Series," a Symposium held at the Regional Research Laboratory, Hderbad, India, SC1R New Delhi, India (1966).

*Primary Examiner*—Henry R. Jiles
*Assistant Examiner*—Robert T. Bond
*Attorney, Agent, or Firm*—Sughrue, Rothwell, Mion, Zinn & Macpeak

[57] ABSTRACT

Thienodiazepine compounds of the general formula:

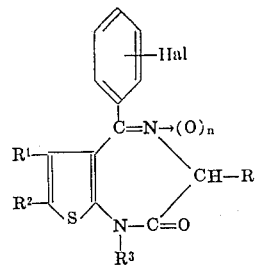

wherein Hal is a halogen; each of $R^1$, $R^2$ and $R^3$ is selected from the group consisting of H and an alkyl group having 1 to 4 carbon atoms, inclusive; R is selected from the group consisting of H, $-OCOCH_3$ and OH; and $n$ is 1 when R is H, and n is 0 when R is selected from the group consisting of $-OCOCH_3$ and OH; and pharmaceutically acceptable addition salts thereof which are useful as minor tranquilizers (anti-anxiety drugs) are disclosed.

1 Claim, No Drawings

THIENODIAZEPINE COMPOUNDS

BACKGROUND OF THE INVENTION

1. Field of the Invention

This invention relates to novel and therapeutically valuable thienodiazepine compounds of the general formula:

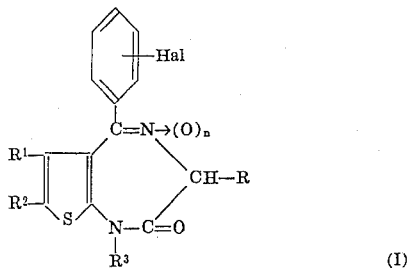

(I)

and pharmaceutically acceptable addition salts thereof, wherein Hal is a halogen; each of $R^1$, $R^2$ and $R^3$ is selected from the group consisting of H and an alkyl group having 1 to 4 carbon atoms, inclusive; R is selected from the group consisting of H, $-OCOCH_3$ and OH; and $n$ is 1 when R is H, and n is 0 when R is selected from the group consisting of $-OCOCH_3$ and OH.

DETAILED DESCRIPTION OF THE INVENTION

The compounds of general formula (I) can be produced by one of the following methods (i) to (iii):

Method i.

This method can be used to produce compounds of general formula (I) wherein R is H. In this method, a compound of the formula

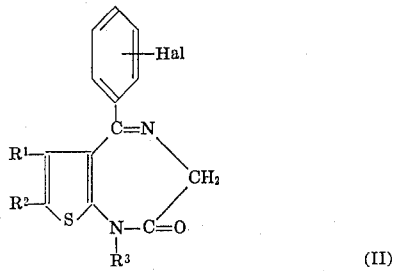

(II)

wherein Hal, $R^1$, $R^2$ and $R^3$ are as defined above, is allowed to react with an oxidizing agent such as hydrogen peroxide, peracetic acid, perbenzoic acid or monoperphthalic acid.

The reaction is usually carried out in a solvent such as water, acetic acid, formic acid or chloroform, at a temperature of from about $-10°C$ to room temperature.

The starting compounds of formula (II) can be prepared, for example, by the method disclosed in Published West Germany Pat. application OLS No. 2107356, namely by subjecting a compound of the formula

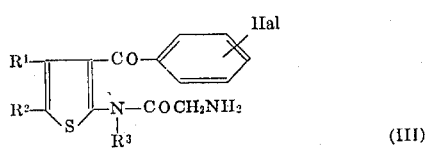

(III)

wherein Hal, $R^1$, $R^2$ and $R^3$ are as defined above, to intramolecular condensation.

Method ii.

This method can be used to produce compounds of general formula (I) wherein R is $-OCOCH_3$. In this method, a compound which is produced by the method (i), having the formula

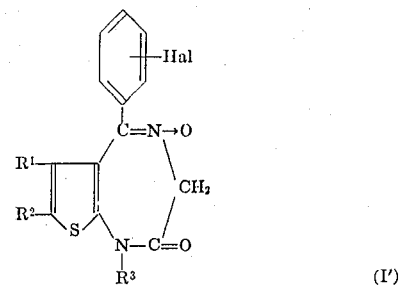

(I')

wherein Hal, $R^1$, $R^2$ and $R^3$ are as defined above, is allowed to react with acetic acid or its functional derivative such as acetic anhydride or acetyl chloride.

The reaction in method (ii) is usually carried out with or without a solvent such as benzene, toluene, dioxane, dimethylformamide or acetic acid, at a temperature of from room temperature to a refluxing temperature, if the solvent is used.

Method iii.

This method can be used to produce compounds of general formula (I) wherein R is OH. In this method, a compound, which is produced by the method (ii), having the formula

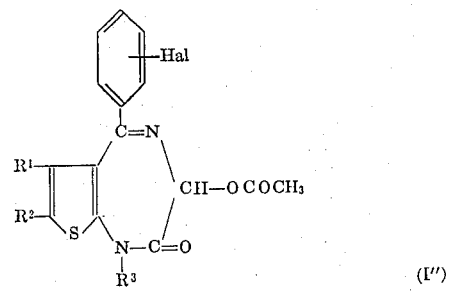

(I'')

wherein Hal, $R^1$, $R^2$ and $R^3$ are as defined above, is subjected to hydrolysis.

The hydrolysis is usually carried out in the presence of an alkali such as sodium hydroxide, potassium hydroxide, sodium carbonate or potassium carbonate, or an acid such as hydrochloric or sulfuric acid, in a solvent such as water, methanol, ethanol, 2-propanol, acetone, benzene, dioxane, tetrahydrofuran, dimethylformamide or a mixture thereof, at a temperature of from room temperature to a refluxing temperature.

The compounds of formula (I) can be converted into the corresponding acid addition salts in a conventional manner by treating the compounds with various inorganic and organic acids, for example, hydrochloric, hydrobromic, oxalic, maleic and fumaric acids.

The compounds of formula (I) wherein R is OH can also be converted into the corresponding alkali addition salts in a conventional manner by treating the compounds with an alkali, for example, sodium hydroxide or potassium hydroxide. These alkali addition salts have the following structure:

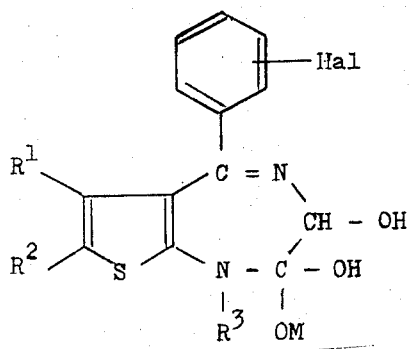

wherein M is an alkali metal (e.g., Na or K), and Hal, $R^1$, $R^2$ and $R^3$ are as defined above.

The compounds of formula (I) and pharmaceutically acceptable addition salts thereof are excellent in narcosis potentiation, suppression of fighting behavior and anticonvulsant effect as shown, for example, by the following tests on the most preferred compound, 1-methyl-3-hydroxy-5-o-chlorophenyl-7-ethyl-1,2-dihydro-3H-thieno-[2,3-e][1,4]diazepin-2-one:

I. Narcosis Potentiation

The influence of the 30 minutes pre-treatment with the test compound on the action of 40 mg/Kg (sub-narcotic dose) of hexobarbital was investigated by using groups each of 6 male mice. The effect of narcosis potentiation by the test compound was determined by the disappearance of righting reflex lasting above 30 seconds. Righting reflex was examined 15 and 30 minutes after the administration of hexobarbital. When no reflex was observed within the above time, the percentage of narcosis potentiation was evaluated as 100%, and $PD_{50}$ (a dose required for 50% potentiation) of the test compound was found graphically to be 2.1 mg/Kg.

II. Suppression of Fighting Behavior

Fighting episodes were produced in mice by the method described by Tedeschi, et al., in Journal of Pharmacology and Experimental Therapeutics, Vol. 125, pp. 28 ff. (1959). Groups of 8 female mice (4 pairs) were given orally the test compound 60 minutes prior to receiving electric foot-shock for 3 minutes with 530 volts interrupted direct current, 13. milliamperes, 10 Hz. Exhibiting 3 fighting episodes or less within 3 minutes were deemed to be an effective suppression by the test compound. The control mice of 81 pairs had shown the fighting episodes of 8.7 times on the average under the same conditions. The $ED_{50}$, the dose required to suppress 50% of fighting pairs, was found graphically to be 1.9 mg/Kg.

III. Anticonvulsant Effect

Pentylenetetrazol (150 mg/Kg) was administered subcutaneously to groups each of 6 mice 15 minutes after the intraperitoneal administration of the test compound. The number of death in mice was counted within 3 hours after the administration of pentylenetetrazol, and then the $ED_{50}$, the dose required to reduce the number of death in mice to 50%, was found graphically to be 0.5 mg/Kg.

In view of various tests, including those mentioned above, the compounds of the invention represented by formula (I) and pharmaceutically acceptable addition salts thereof can be safely administered orally as minor tranquilizers (antianxiety drugs) for the treatment of neurosis, anxiety, tension and depressive states, in the form of a pharmaceutical preparation with a suitable and conventional pharmaceutically acceptable carrier or adjuvant, without adversely affecting the patients.

The pharmaceutical preparations can take any conventional form such as tablets, capsules or powders.

Formulation Examples a. Tablets each containing 5 mg of an active ingredient are prepared from the following compositions:

| | |
|---|---|
| Compound (I) | 5.0 mg |
| Lactose | 50.0 |
| Starch | 23.4 |
| Methyl Cellulose | 0.6 |
| Magnesium Stearate | 1.0 |
| | 80.0 mg | b. A 10% powder is prepared from the following compositions:

| | |
|---|---|
| Compound (I) | 10% by weight |
| Lactose | 80 |
| Starch | 6.9 |
| Methyl Cellulose | 0.6 |
| Microcrystalline Cellulose | 2.5 |
| | 100% |

The daily dose of compound (I) or a salt thereof for human adults usually ranges from about 10 to 30 mg, in single or multiple dose, but it may vary depending upon the age, body weight, and/or severity of the conditions to be treated as well as the response to the medication.

The present invention will be better understood from the following examples, but they are not to be construed as limiting the present invention.

EXAMPLE 1

Ten grams of 1-methyl-5-o-chlorophenyl-7-ethyl-1,2-dihydro-3H-thieno[2,3-e][1,4]diazepin-2-one is dissolved in a mixture of 15 ml of glacial acetic acid and 4 ml of acetic anhydride. To the resulting solution is then added 15 ml of a 35% hydrogen peroxide solution while ice-cooling, and the whole mixture is allowed to stand at 5°C for 48 hours. Then the reaction mixture is poured into ice water, and the aqueous solution is extracted with ethyl acetate. The extract is washed with an aqueous sodium hydrogen carbonate solution and dried, and then the solvent is distilled off under reduced pressure. The thus-obtained crude crystalline product is recrystallized from a mixture of hexane and toluene (3:1) to give 1-methyl-5-o-chlorophenyl-7-ethyl-1,2-dihydro-3H-thieno[2,3-e][1,4]diazepin-2-one 4-oxide as white crystals, melting at 117° – 118°C, in 95% yield.

Using the procedure set forth in Example 1, but substituting equivalent amounts of the appropriate starting compounds, the following compounds are also produced:

a. 5-o-chlorophenyl-7-ethyl-1,2-dihydro-3H-thieno[2,3-e][1,4]diazepin-2-one 4-oxide, white crystals, melting at 225°C with decomposition.

b. 1,7-dimethyl-5-o-chlorophenyl-1,2-dihydro-3H-thieno[2,3-e][1,4]diazepin-2-one 4-oxide, colorless crystals, melting at 150° – 151°C.

c. 1,6,7-trimethyl-5-o-chlorophenyl-1,2-dihydro-3H-thieno [2,3-e][1,4]diazepin-2-one 4-oxide, colorless crystals, melting at 180° – 181°C.

EXAMPLE 2

To 5 g of 5-o-chlorophenyl-7-ethyl-1,2-dihydro-3H-thieno-[2,3-e][1,4]diazepin-2-one 4-oxide are added 57 ml of glacial acetic acid and 8.3 ml of acetic anhydride, and the whole mixture is heated under reflux for 50 minutes. Then the solvent is distilled off under reduced pressure, and the residual crude crystalline product is recrystallized from ethanol to give 3-acetoxy-5-o-chlorophenyl-7-ethyl-1,2-dihydro-3H-thieno[2,3-e][1,4]diazepin-2-one as white crystals, melting at 219° – 220°C with decomposition, in 81% yield.

Using the procedure set forth in Example 2, but substituting equivalent amounts of the appropriate starting compounds, the following compounds are also produced:
  a. 1-methyl-3-acetoxy-5-o-chlorophenyl-7-ethyl-1,2-dihydro-3H-thieno[2,3-e][1,4]diazepin-2-one, a pale yellow oil, showing $n_D^{20}$ 1.5776.
  b. 1,7-dimethyl-3-acetoxy-5-o-chlorophenyl-1,2-dihydro-3H-thieno[2,3-e][1,4]diazepin-2-one, colorless crystals, melting at 201° – 202°C.
  c. 1,6,7-trimethyl-3-acetoxy-5-o-chlorophenyl-1,2-dihydro-3H-thieno[2,3-e][1,4]diazepin-2-one, colorless crystals, melting at 111° – 112°C.

EXAMPLE 3

3-Acetoxy-5-o-chlorophenyl-7-ethyl-1,2-dihydro-3H-thieno-[2,3-e][1,4]diazepin-2-one (3.5 g) is dissolved in 40 ml of acetone, 12 ml of 2N sodium hydroxide solution is added, and the whole mixture is stirred at 25°C for 10 minutes. Then the solvent is distilled off under reduced pressure, and the residue is acidified with 5% hydrochloric acid. The acidic solution is then made alkaline with sodium hydrogen carbonate, the alkaline solution is extracted with chloroform, the chloroform phase is dried over sodium sulfate, and the solvent is distilled off under reduced pressure. The thus obtained crude crystalline product is recrystallized from ethanol to give 3-hydroxy-5-o-chlorophenyl-7-ethyl-1,2-dihydro-3H-thieno[2,3-e][1,4]diazepin-2-one as pale yellow crystals, melting at 153° – 154°C with decomposition, in 97% yield. This product is dissolved in an ethanolic solution containing an equimolar amount of sodium hydroxide, and the resulting solution is concentrated. The thus obtained crude crystalline product is recrystallized from 80% ethanol to give the corresponding sodium hydroxide addition salt as white crystals, melting at 239° – 240°C with decomposition.

Using the procedure set forth in Example 3, but substituting equivalent amounts of the appropriate starting compounds, the following compounds are also produced:
  a. 1-methyl-3-hydroxy-5-o-chlorophenyl-7-ethyl-1,2-dihydro-3H-thieno[2,3-e][1,4]diazepin-2-one, pale yellow crystals, melting at 142° – 143°C.
  b. 1,7-dimethyl-3-hydroxy-5-o-chlorophenyl-1,2-dihydro-3H-thieno[2,3-e][1,4]diazepin-2-one, colorless crystals, melting at 168° – 169°C.
  c. 1,6,7-trimethyl-3-hydroxy-5-o-chlorophenyl-1,2-dihydro-3H-thieno[2,3-e][1,4]diazepin-2-one, colorless crystals, melting at 183° – 184°C with decomposition.

Although the present invention has been adequately discussed in the foregoing specification and examples included therein, one readily recognizes that various changes and modifications may be made without departing from the spirit and scope thereof.

What is claimed is:
1. The compound: 1-Methyl-3-hydroxy-5-o-chlorophenyl-7-ethyl-1,2-dihydro-3H-thieno-[2,3-e][1,4]diazepin-2-one.

* * * * *